United States Patent [19]

Moore

[11] 4,138,885
[45] Feb. 13, 1979

[54] GAGE FOR SETTING SEWING MACHINE BOBBIN TENSION

[76] Inventor: Vernon S. Moore, P.O. Box 676, Hines, Oreg. 97738

[21] Appl. No.: 850,392

[22] Filed: Nov. 10, 1977

[51] Int. Cl.² ............................................. G01L 5/12
[52] U.S. Cl. ................................ 73/141 AB; 73/143; 112/1
[58] Field of Search ........................... 112/229, 247, 1; 73/141 AB, 143

[56] References Cited

U.S. PATENT DOCUMENTS

| | | | |
|---|---|---|---|
| 136,626 | 3/1873 | Tiffany | 73/143 |
| 1,084,736 | 1/1914 | Hagelstein | 112/247 |
| 1,305,780 | 6/1919 | Dilks | 73/143 |
| 2,457,245 | 12/1948 | Larson et al. | 73/143 |
| 2,625,819 | 1/1953 | Miller | 73/143 |
| 2,694,926 | 11/1954 | Hansen et al. | 73/143 |
| 2,987,913 | 6/1961 | Whitehead, Jr. | 73/141 AB |

*Primary Examiner*—Wm. Carter Reynolds
*Attorney, Agent, or Firm*—Chernoff & Vilhauer

[57] ABSTRACT

A gage for setting sewing machine bobbin tension is comprised of a tensioning member which is located substantially within an open topped cylindrical case and which has gripping means arranged to extend out of the case, through an elongate opening in its side, for releasably engaging thread from a sewing machine bobbin. The tensioning member includes a tightly wound coil which fits rotatably over a post located in the case, but which is prevented from rotating on the post by means of a tab extending from one of its ends. The other end of the coil extends across the case to provide a straight indicating section, and an extention section extends at an acute angle from the indicating section back across and out of the case through the opening. A window located in a lid which covers the open top of the case is arranged to display a portion of the indicating section. When the bobbin is pulled relative to the case the tensioning member is pulled further out of the case, however, the amount of its displacement is limited and is proportional to the pulling force on it due to the spring effect of the coil, which is rotatably limited. Therefore the relative position of the indicating section in the window is indicative of the bobbin tension.

4 Claims, 3 Drawing Figures

GAGE FOR SETTING SEWING MACHINE BOBBIN TENSION

BACKGROUND OF THE INVENTION

This invention relates to a gage used for measuring the amount of tension force necessary to unspool thread from a sewing machine bobbin.

In machine sewing, thread fed from sources above and below the material being sewn is interstitched by action of the machine, and the tension of the thread which is fed from both sources is critical in forming a proper switch. Furthermore, the amount of tension must be adjusted for sewing materials having different weights and thicknesses. Accordingly, the tension, or resistance, imparted to the thread from both sources must be adjustable. The feed mechanism of the main thread supply (that spread which is supplied from above the material) contains an adjustable drag which is calibrated, and therefore its tension can be set to a reasonable degree of certainty. However, the thread supplied to the bottom of the material is fed from a self contained spool or bobbin, containing integral tensioning means which are not calibrated. Therefore, the tension of the bobbin is not so easily adjusted.

In practice the machine operator does not adjust the bobbin tension and relies primarily on the main thread adjustment to tailor the thread supply tension to differing sewing conditions. In those instances where the bobbin tension must be adjusted, it is done so by trial and error, using the resulting stitch as the gage.

The problem arises when the bobbin tension becomes so far out of adjustment that the machine will not function at all or else it functions so poorly that the operator can no longer use the stitch as the means of gaging tension. When this happens the user is often unable to determine what the problem is and the machine must be taken to a repair shop for adjustment. The shop will normally completely clean and service the machine in addition to adjusting bobbin tension which adds to the cost of the repair, and the bobbin tension then is adjusted by the repairmen primarily by his sense of feel and his experience.

SUMMARY OF THE INVENTION

Accordingly, the present invention provides a gage which measures the force necessary to unreel thread from a sewing machine bobbin thereby permitting the bobbin to be adjusted to the proper tension. The gage comprises an open topped cylindrical case having an elongate slot located in its side wall. Located within the case is tensioning means which comprises a length of spring wire wound into a tight coil which has a tab located at one end and a straight indicating section located at its other end, with the tab and indicating section extending from the coil, in approximately opposite directions. The tensioning means is mounted in the case by placing the coil over a post located in the bottom of the case. The wire is looped at the end of the indicating section and forms a straight extention section which passes away from the indicating section at an acute angle out of the opening in the case. Gripping means are located at the end of the extention section for releasably engaging the bobbin thread. The case is covered by a lid which as an arcuate transparent window located in it above a portion of the indicating section.

In operation, when the bobbin is pulled away from the case the tensioning means is pulled further out of the case. However, the amount of its displacement is limited and it achieves an equilibrium position where it remains even though the bobbin is still being pulled. Since the coil is prevented from rotating on the post by means of the tab striking the case sidewall, the coil twists or wraps up on the post so that increased travel of the tension means meets with increased resistance. When the force necessary to unwind the thread from the bobbin equals the resistance of the displacement means, the displacement means is at its equilibrium position. The relative force at this position then is indicated by the position of the indicating section in the window.

It is a principle objective of the present invention to provide a gage which is particularly adopted for measuring the tension setting of a sewing machine bobbin.

It is a further object of the present invention to provide such a gage which is simple to use and which is accurate.

It is a further object of the present invention to provide such a gage which is economical to produce and which is rugged and dependable in use.

The foregoing and other objects, features, and advantages of the principle invention will be more readily understood upon consideration of the following detailed description taken in conjunction with the accompanying drawings.

Detailed Description of the Invention

Figure 1:
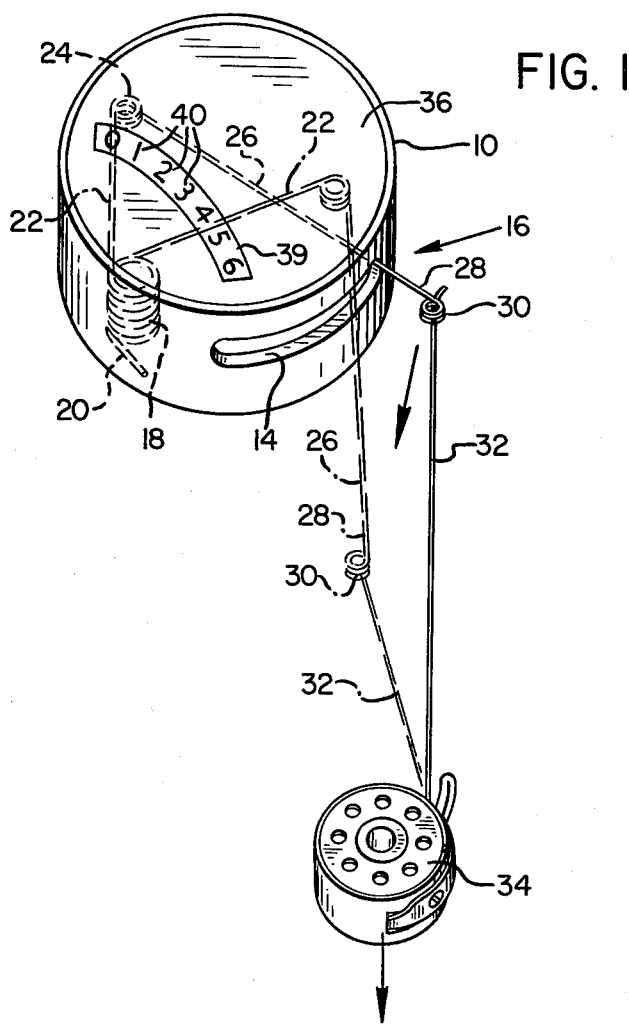
FIG. 1 is a pictorial view showing a preferred embodiment of the gage of the present invention.
Figure 3:
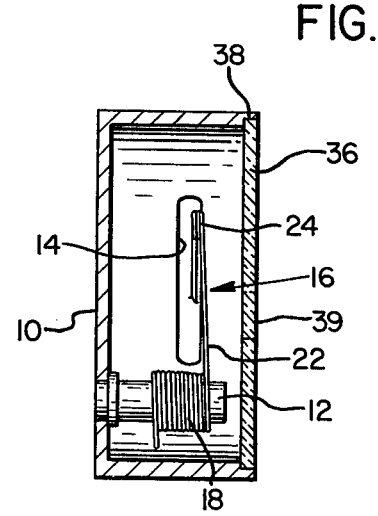
FIG. 3 is a sectional view taken on the line 3—3 in FIG. 2.

Referring to FIG. 1 of the drawings, the gage of the present invention is contained within a case 10 which is illustrated as being comprised of an open topped cylindrical shell. Located near one side of the case is an upstanding post 12, FIGS. 2 and 3, and an elongate slot 14 is defined in the side of the case at an angular location generally 90° to one side of post 12.

Tensioning means 16, which is the operational member of the gage, is constructed from a length of spring wire and is located within the case except for its extremity which passes out of the case through slot 14. The tensioning means comprises a coiled section 18 located at one of its ends, thereby forming a spriral spring, which is arranged to fit over post 12. The coil has a tab 20 extending from one end which engages the side of the case when coil 18 is twisted clock wise (looking from the top in FIGS. 1 and 2). Therefore the coil is prevented from rotating on the post and increased twisting of it meets with increased resistance due to the spring effect of the coil.

Figure 2:
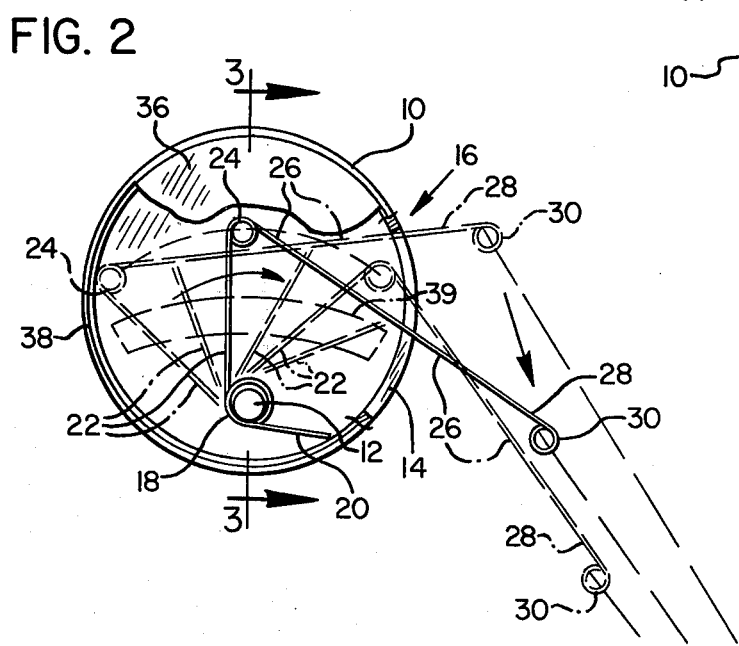
FIG. 2 is a plan view, partially broken away to show hidden construction, of the gage of FIG. 1.

Extending from the other end of coil 18 is a straight indicator section 22 which is oriented at an obtuse angle with respect to tab 20. In the embodiment illustrated, the indicator section extends to a point where its end rests against the sidewall of the case when coil 18 is slightly tensioned. A looped section 24, located at the end of the indicator section, connects the indicator section to a straight extention section 26 which is oriented at an acute angle with respect to the indicator section. The extention has an extremity portion 28 which extends out of the case through slot 14 and which includes tightly coiled gripping means 30 at its extremity for engaging the end of a piece of thread 32 which projects from a sewing machine bobbin 34. Accordingly, when the gripping means is pulled downwardly, as shown in FIG. 2, loop 24 and indicating section 22 are pulled across the case to the position shown by the dashed lines in FIG. 2, and coil 18 is wound tight due to the interaction of tab 20 with the wall of the case.

The top of the case is covered by a lid 36 which removably fits into a knotch 38 which is formed in the top edge of the case. The lid is shown as being either translucent or opaque over most of its extent it order to cover the contents of the case, but has display means, such as an arcuate transparent window 39 located in it. The lid is placed on the case with the window oriented so that a longitudinal portion of indicator section 22 is visible through the window over the full range of travel of the tensioning means.

Numerals 40 are imprinted on the window at spaced intervals in order to calibrate the gage and thereby indicating the relative position of the tensioning means.

In operation, with a top or front loading sewing machine for example, the end of bobbin thread 32 is fastened to tensioning means 16 by placing it between adjacent loops of gripping means 30. The user then holds and pulls the bobbin relative to the case in the direction shown by the arrows in FIGS. 1 and 2. Accordingly, the tensioning means is pulled further out of the case, toward the dashed line position in FIG. 1. However, since the movement of the tensioning means is increasingly resisted by coil 18, which is prevented from twisting on post 12 by tab 20, the tensioning means eventually reaches an equilibrium position, and further pulling of the bobbin has no effect on the gage. The particular equilibrium position achieved depends upon the force required to unreel thread from the bobbin; therefore by altering the tension of the bobbin the equilibrium position also is changed. Thus the position of indicating portion 22 on window 39 is indicative of the bobbin tension, thereby allowing the bobbin tension to be adjusted to a desired predetermined level. The gage is used similarly with a side loading machine except that the bobbin does not have a removeable case and thus remains in the machine during the operation.

Also, since the bobbin tension required for proper operation on side loading sewing machines is different than it is for top or front loading machines, the range of the gage must be sufficient to cover each type and if desired guide lines (not shown) can be placed on lid 36 opposite the numerals which correspond to the proper tension position for each of these types of machines.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A device for gaging the force required to unspool thread from a sewing machine bobbin comprising:
    (a) a case, defining a side opening therein;
    (b) tensioning means mounted substantially within said case, and having an extremity portion projecting outwardly from said case through said opening, for measuring the amount of force required to unspool said thread from said bobbin;
    (c) gripping means associated with said extremity portion of said tensioning means for releasably engaging said thread;
    (d) indicating means associated with said tensioning means for indicating the amount of said force;
    (e) display means associated with said indicating means for displaying the amount of said force;
    (f) wherein the tensioning means and indicating means are integral and comprise;
       1. a length of spring wire,
       2. a coiled section located at one end of said wire in a manner to form a spiral spring,
       3. a straight indicator section located in said wire adjacent to said coil section,
       4. a straight extension section located in said wire adjacent to said indicator section and oriented at an acute angle therewith, and
       5. a looped section interconnecting said indicator section and said extension section in a manner to allow angular deflection therebetween.

2. The device of claim 1 wherein the gripping means comprises a tightly coiled section of said wire located at its extremity.

3. The device of claim 1 wherein the case comprises an open topped cylindrical shell and the display means comprises a lid configured for enclosing said open topped cylindrical shell and having a transparent window located therein in a manner to display a longitudinal portion of the indicator section of said wire.

4. The device of claim 3 including numerals imprinted on said lid at spaced intervals located along said window to calibrate said display means.

* * * * *

UNITED STATES PATENT AND TRADEMARK OFFICE
CERTIFICATE OF CORRECTION

PATENT NO. : 4,138,885
DATED : February 13, 1979
INVENTOR(S) : Vernon S. Moore

It is certified that error appears in the above-identified patent and that said Letters Patent are hereby corrected as shown below:

Col. 1, Line 13 Change "switch" to read --stitch--.

Col. 1, Line 18 Change "spread" to read --thread--.

Col. 1, Line 65 Change "as" to read --has--.

Col. 2, Line 13 Change "principle" to read --principal--.

Col. 2, Line 23 Change "principle" to read --principal--.

Sub-title "Detailed Description of the Invention" not capitalized.

Col. 2, Line 49 Change "spriral" to read --spiral--.

Col. 3, Line 9 Change "knotch" to read --notch--.

Col. 2, Lines 7 and 55 Change "resistence" to read --resistance--.

Col. 1, Line 16 Change "resistence" to read --resistance--.

Signed and Sealed this

Eighth Day of May 1979

[SEAL]

Attest:

RUTH C. MASON
Attesting Officer

DONALD W. BANNER
Commissioner of Patents and Trademarks